Patented Aug. 19, 1952

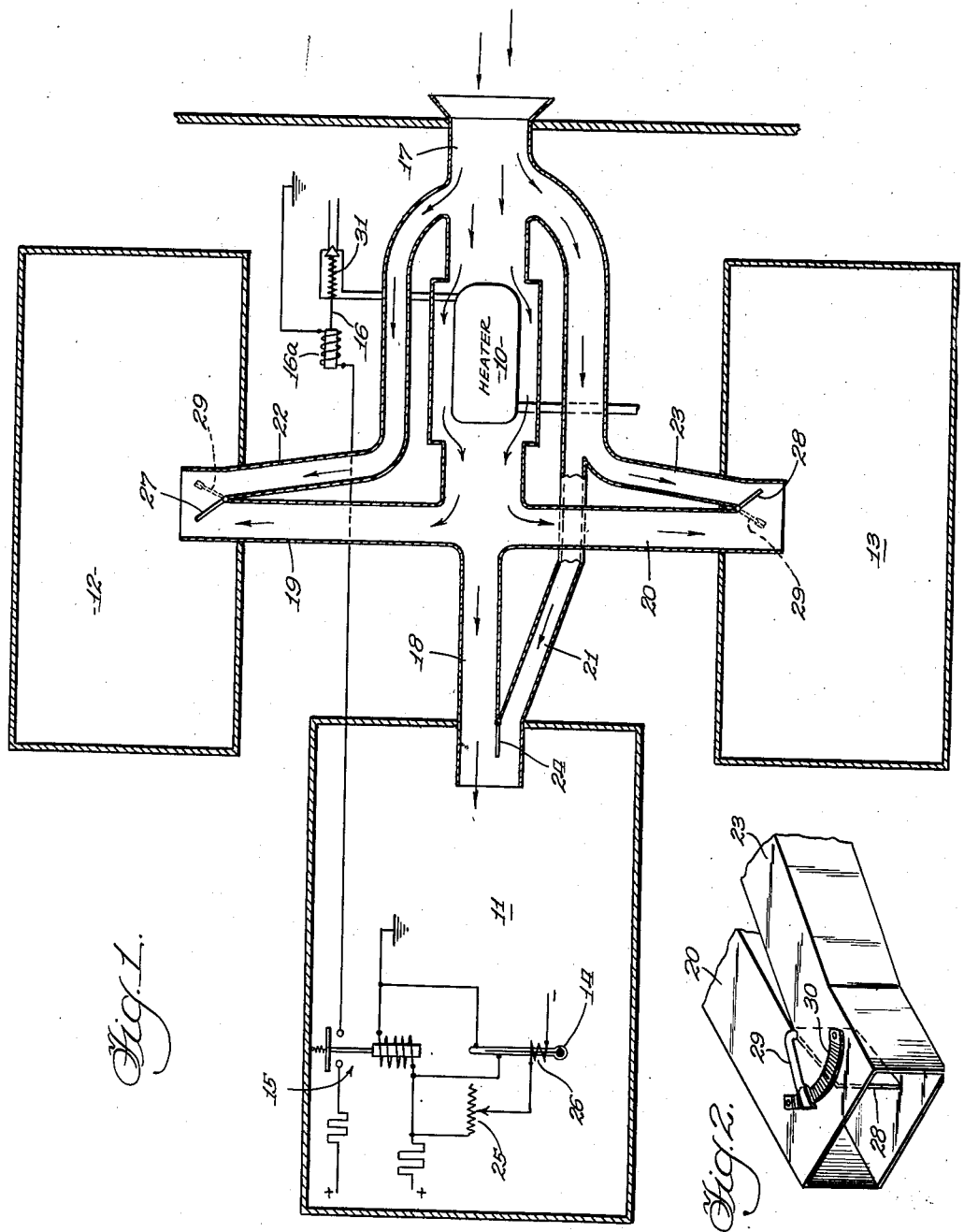

2,607,534

UNITED STATES PATENT OFFICE 2,607,534

TEMPERATURE CONTROL SYSTEM FOR A PLURALITY OF ENCLOSED SPACES

Timothy J. Lehane, North Riverside, Ill., assignor to Vapor Heating Corporation, Chicago, Ill., a corporation of Delaware Application March 25, 1949, Serial No. 83,397

3 Claims. (Cl. 237—2)

This invention relates to improvements in temperature control systems of the general class in which heat from a controlled source is delivered to a plurality of enclosed spaces.

A principal object of the invention is to provide, in a temperature control system in which the output of a heating device is delivered to a plurality of enclosed spaces, improvements whereby the heating device will be automatically controlled in relation to the heating demands of one of said spaces, hereinafter designated the control space, and in which selected temperatures for all said enclosed spaces will be automatically maintained.

A further and more specific object of the invention is to provide, in a heating system of the above class, improved means whereby heated air, in a hot air duct intermediate an air heating device and each of the enclosed spaces, is automatically maintained at a temperature substantially higher than the temperature of the air delivered into the control space, whereby the individual temperatures selected for the other enclosed spaces may be equal to the temperature of the control space or may be higher or lower than the temperature of said control space.

According to the principles of the present invention, air under pressure, is directed through a heating device wherein it is heated and thereafter delivered, by means of suitable hot air ducts, into each of a plurality of enclosed spaces. The functioning of the heating devices is controlled by means responsive to the temperature of one of the enclosed spaces. Consequently the temperature of the air within the hot air duct, being a function of the heating demand of the control space, will vary from time to time in relation to said heating demand. The heated air delivered into the control space is blended, in a fixed proportion, with a stream of cold air so that the air entering the control space will always be substantially cooler than the air in the hot air ducts intermediate the air heater and the several spaces being heated. Adjustable valves control the volume of hot air delivered to each of the other spaces which receive heat from the same heating device. When these valves are adjusted to select a suitable temperature for the said other enclosed spaces, the selected temperatures will be automatically maintained by the functioning of the control devices in the control space.

The invention is illustrated in the accompanying drawing wherein:

Fig. 1 is a diagrammatic illustration of a combined heating and control system constructed in accordance with this invention.

Fig. 2 is a detail view of the adjustable valves for controlling the proportion of heated and cool air delivered into certain of the enclosed spaces.

Referring now to the drawing:

10 designates an air heater for supplying heated air to each of a plurality of spaces 11, 12 and 13. There are only three such enclosed spaces illustrated in the drawing, but the number of such enclosures will vary in different installations and, therefore, will depend upon the character of the installation and the capacity of the heater 10. The said heater may be of any approved construction adapted to be controlled by electrically energized control means located in one of the enclosed spaces. In the present installation, the control means, comprising a thermostat 14 and a relay 15, are located in space 11, the said space 11 being hereinafter referred to as the control space.

The heater 10 is shown diagrammatically. It may be of a known type in which gasoline or other liquid fuel is supplied thereto through a solenoid valve 16 or it may be a known type in which steam or hot water are utilized as a heating medium; the supply of such medium to the heater being controlled by the said valve 16 under the control of thermostat 14. The air to be heated is delivered to the heater 10, under pressure, through an air duct 17 leading into the heater wherein the air absorbs heat from the heated walls thereof and is delivered through ducts 18, 19 and 20 to the several spaces 11, 12 and 13, respectively. The particular manner in which the air pressure is created is not important insofar as the broad aspect of this invention is concerned. Obviously, the said air can be forced into the duct 17 by means of a blower (of known construction not shown) or it may be forced into the said duct by movement of the structure as a whole through the atmosphere.

The air duct 17, in addition to delivering air to the heater 10, supplies cool air, through branch ducts 21, 22 and 23 to each of the hot air ducts 18, 19 and 20, respectively, near their discharge ends so that the air delivered into each of said enclosures 11, 12 and 13 will be composed of hot and cold air blended to suitable temperatures to maintain the desired temperatures within the enclosed spaces. The volume of hot and cold air delivered into the control chamber 11 is fixed by means of the non-adjustable valve element 24. It will, therefore, be seen that the ratio of heated air to cold air entering the space 11 is fixed and that as a consequence of this arrangement the air delivered into the control space is always cooler than the air contained in the hot air ducts 18, 19 and 20. It will also be observed that, since the effectiveness of the heater 10 is controlled by the thermostat 14 within the space 11, the temperature of the air within the hot air conduits is a function of the heating demands of the control space 11. For example, assuming that it is desired to maintain the temperature of the space 11 at 75° Fahrenheit and that, it is necessary, with a given outside temperature, to maintain a temperature of approximately 200° Fahrenheit within the hot air ducts 18, 19 and 20. If the outside temperature decreases or increases from the given temperature, it will be necessary to proportionately increase or decrease the temperature of the air within the hot air ducts to compensate for the change in the heating demand of space 11.

The temperature to be maintained in any of the said spaces may be selected by the occupants of such spaces. Inasmuch as the proportions of hot and cold air delivered into the control space 11 are fixed, the temperatures of this space is determined by adjustment of the functional setting of the thermostat 14. This adjustment is accomplished by means of a variable resistance 25 interposed in the energizing circuit of an auxiliary heater 26 adapted to add measured amounts of heat to the thermostat 14. For example, if it is desired to reduce the functional setting of the thermostat 14 from 75° Fahrenheit to 74° Fahrenheit the movable element of the variable resistance 25 is adjusted toward the left to increase the flow of electrical energy through the auxiliary heater 26; the amount of additional energy being sufficient to raise the temperature of the thermostat 1°. If it should be desired to increase the functional setting of the thermostat 14, the movable element of the variable resistance is moved toward the right so as to reduce the flow of electrical energy through the auxiliary heater 26. The delivery of hot and cold air into the spaces 12 and 13 may be proportionately varied by appropriate adjustments of the valves 27, 28 by handle 29 so as to increase and reduce the relative amounts of hot and cold air delivered and thereby alter the control point of the temperatures for said spaces 12 and 13. In Fig. 1 of the drawing the valve 27 is indicated in a position to restrict the amount of heated air entering the enclosed space 12 so that there is less volume of heated air delivered into this space than is delivered into the control space 11. Consequently the air delivered into the space 12 is substantially cooler than the air delivered into space 11 and consequently the temperature maintained therein is substantially lower. The valve 28 for controlling the proportion of hot and cold air entering space 13 is adjusted to a position which restricts the volume of cold air entering the space relative to the volume of heated air. It is apparent, therefore, that the temperature control point of space 13 is substantially higher than is maintained in the control space 11. However, in any event, the temperature selected for the spaces 12 and 13 will be automatically maintained by the operation of the control elements in the control space 11.

In Fig. 2 there is illustrated, in perspective, the discharge end of the conduits 20 and 23 adjacent the valve 28 and showing the valve provided with an operating handle 29. The handle 29 has some resilience and is adapted when moved, from one position to another, to engage in depressions 30 formed in the duct so as to hold the valve 28 in any desirable position.

Returning to the heating member 10 and the solenoid valve 16 for controlling the supply of fuel or the supply of heating medium, as the case may be, the said valve is normally held in its closed position by means of a spring 31 and is opened by the energization of the solenoid 16a. The energizing circuit for the solenoid 16a is controlled by means of the relay 15 which is under the control of the thermostat. The relay is normally opened when the thermostat is satisfied, the upper and lower contacts of the thermostat being connected around the solenoid of the relay so as to de-energize the said relay when the mercury column engages the upper contact. The closing of said thermostat also de-energizes the auxiliary heater 26 so that the thermostat 14 will cycle off its upper contact when the value of the auxiliary heater 26 is preferably 2° so that the thermostat 14 will cycle when the temperature of the control space 11 reaches 2° below its control point.

I claim:

1. A temperature control system comprising means defining a plurality of air ducts for delivering heated air into a control space and into an additional space, temperature altering means controllably operable for altering the temperature of the heated air in said heated air ducts, means defining an air passage for delivering, into said control space, unheated air at a fixed volume ratio relative to the heated air delivered into said control space, means including a thermostat responsive to the temperature of said control space for controlling the temperature of the air in said heated air ducts, whereby the duct temperature of this air is a function of the heating demand of the control space, and an adjustable valve for selectively varying the volume of heated air delivered into said additional space in relation to the volume of unheated air delivered thereto, whereby temperatures selected for said additional space may be higher or lower than the temperature of the control space and will be automatically controlled by varying the temperature of the heated air delivered thereto in relation to the heating demand of the control space.

2. A temperature control system comprising means defining a plurality of air ducts for delivering heated air into a control space and into a plurality of additional spaces, temperature altering means controllably operable for altering the temperature of the heated air in said heated air ducts, means defining an air passage for delivering, into said control space, unheated air at a fixed volume ratio relative to the heated air delivered into said control space, means defining air ducts for delivering unheated air into said additional spaces, means including a thermostat responsive to the temperature of said control space for controlling the temperature of the air in said heated air ducts, whereby the duct temperature of this air is a function of the heating demand of the control space, and adjustable valve means for proportionately varying the volumes of heated and unheated air delivered into the individual additional spaces, whereby different temperatures having values higher or lower than the temperature of the control space may be selected of the several additional spaces and such selected temperatures will be automatically controlled by varying the temperature of the heated air delivered into said additional spaces in relation to the heating demand of the control space.

3. A temperature control system comprising an air heater, means defining a main air duct for delivering air under pressure to said heater, means defining branch ducts for delivering heated air from said heater into a control space and into a plurality of additional spaces, means defining a branch duct communicating with said main duct and delivering, into said control space, unheated air at a fixed volume ratio relative to the heated air delivered into said control space, means defining branch ducts for delivering unheated air into each of the additional spaces, means including a thermostat responsive to the temperature of the space for varying the effectiveness of said air heater, whereby the temperature of the heated air in said heated air ducts, is a function of the heating demand of the control space, and an electrical heater for said thermostat, means defining an energizing circuit therefor including a variable resistor in said circuit, whereby the functional setting of the thermostat may be adjusted, and valve means for proportionately varying the volume of heated and unheated air delivered into the individual additional spaces, whereby different temperatures for the several spaces may be determined by the adjustments of said valves and the said temperatures will be automatically controlled in relation to the heating demands of the control space.

TIMOTHY J. LEHANE.

REFERENCES CITED

The following references are of record in the file of this patent:

UNITED STATES PATENTS

| Number | Name | Date |
| --- | --- | --- |
| 2,202,995 | Porwancher | June 4, 1940 |
| 2,364,458 | McCollum | Dec. 5, 1944 |
| 2,401,004 | Lehane et al. | May 28, 1946 |